UNITED STATES PATENT OFFICE.

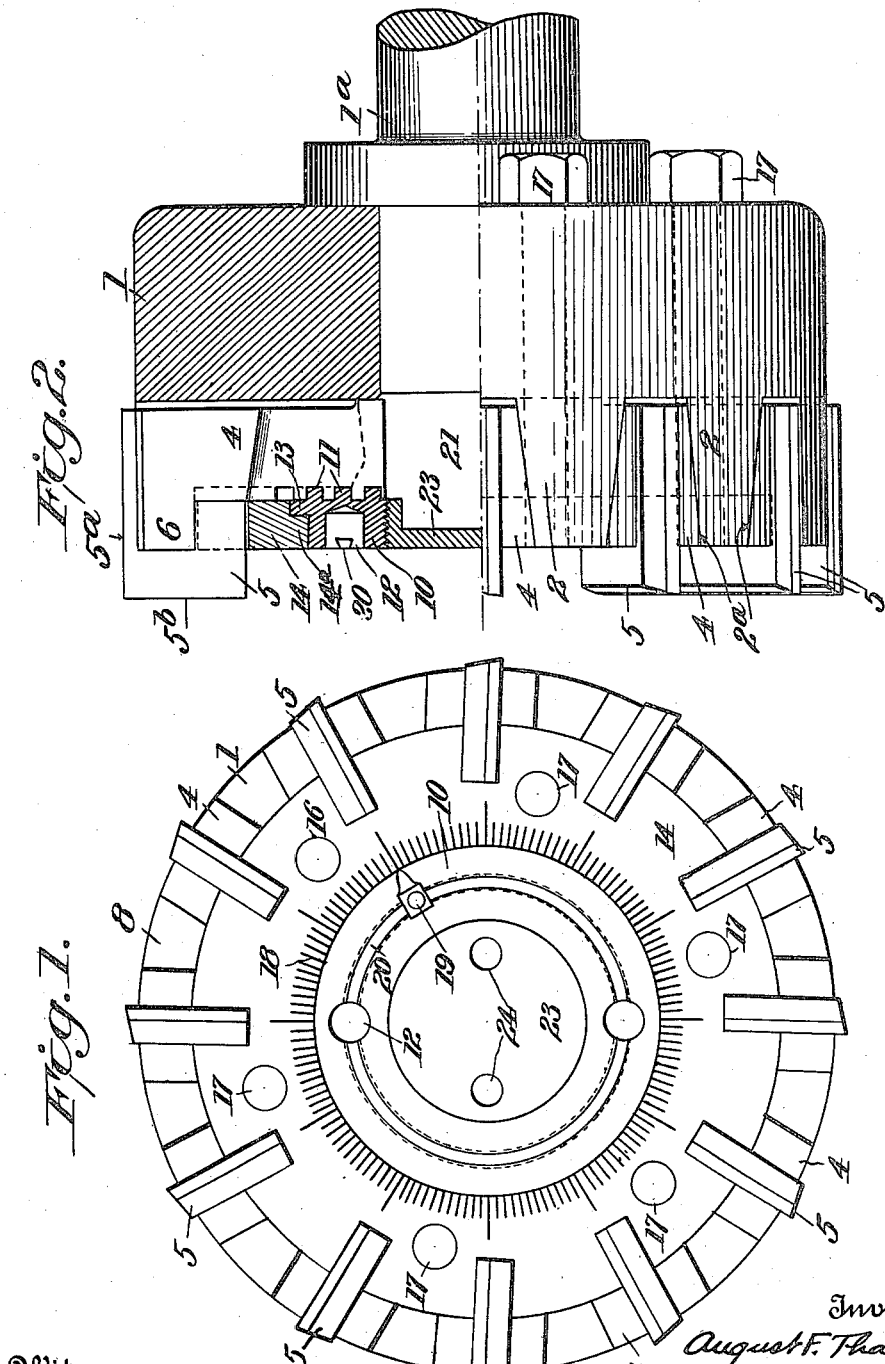

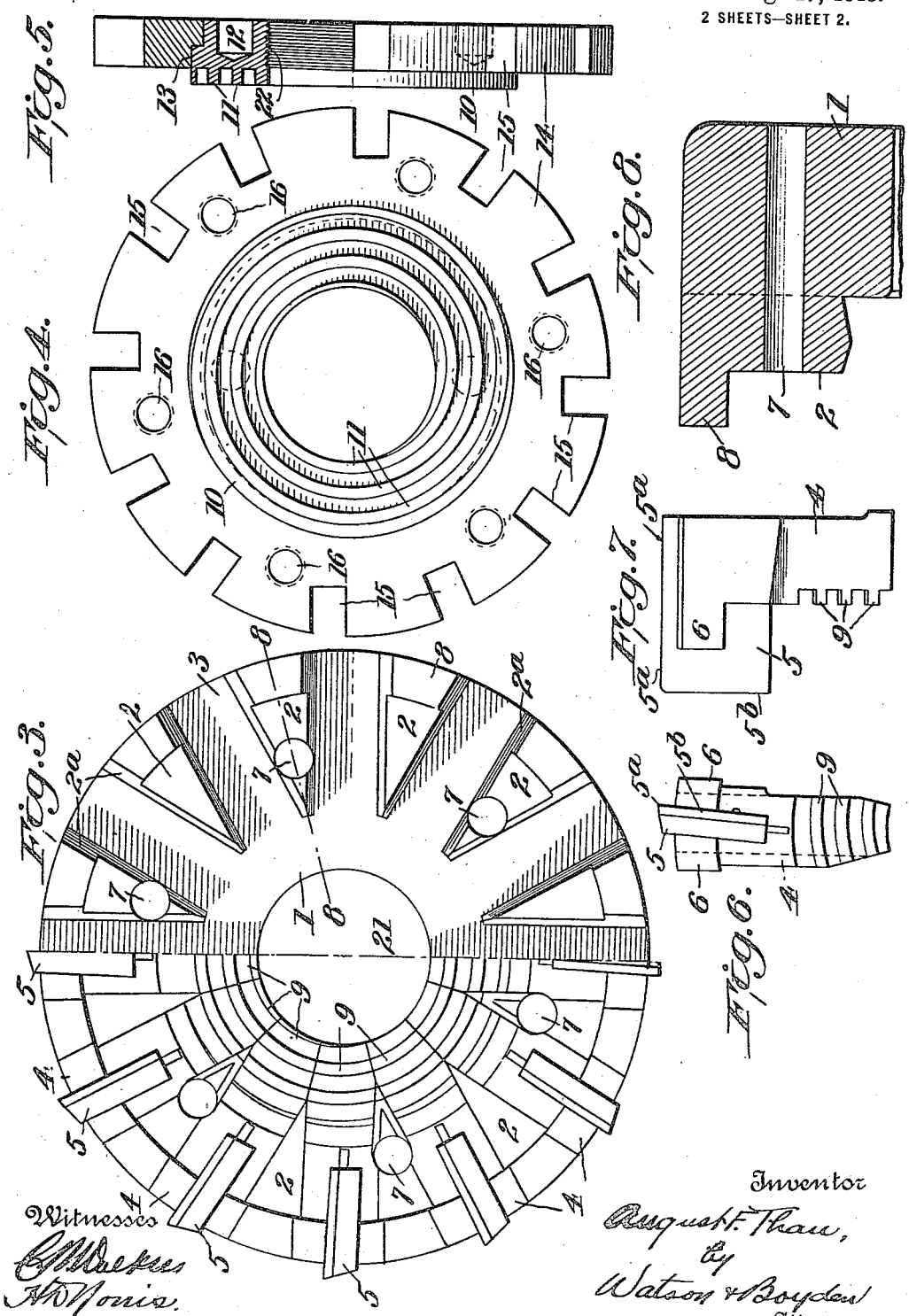

AUGUST FRANZ THAU, OF FRANKFORT-ON-THE-MAIN, GERMANY, ASSIGNOR TO MATHIAS THAU, OF GOVANS, MARYLAND.

MILLING-CUTTER.

1,150,555. Specification of Letters Patent. Patented Aug. 17, 1915.

Application filed February 19, 1915. Serial No. 9,276.

*To all whom it may concern:*

Be it known that I, AUGUST FRANZ THAU, a subject of the German Emperor, residing at Frankfort-on-the-Main, Germany, have invented certain new and useful Improvements in Milling-Cutters, of which the following is a specification.

This invention relates to cutter heads for milling cutters, and more particularly to that type of machines which cut both on the periphery and face of the head.

One object of the invention is to provide improved means for assembling and positioning the parts of the cutter head, and for radially adjusting the cutters.

Another object is to provide tool holders of improved construction and neat design, whereby they will lie flush with the face of the cutter head when assembled, and present a well finished appearance.

The invention also contemplates an improved arrangement of scale and pointer, whereby the amount of radial adjustment given to the cutters may be readily determined.

In order that the invention may be clearly understood, reference is had to the accompanying drawings, forming a part of this specification, and in which, Figure 1 is a front or face view of my complete cutter head; Fig. 2 is a side view, half elevation and half longitudinal section; Fig. 3 is a front view of the cutter head with the retaining plate and associated parts removed, half of the view showing the cutters in position, the other half showing the body with the cutters removed; Fig. 4 is an inside face view of the retaining plate and adjusting disk hereinafter described; Fig. 5 is an edge view of these elements, partly in side elevation and partly in central section; Fig. 6 is an end view of one of the cutters; Fig. 7 is a side view thereof; and, Fig. 8 is a fragmentary section substantially on the line 8—8 of Fig. 3.

My improved cutter head comprises a cylindrical body 1, secured to the usual spindle 1$^a$.

Projecting from the front face of the body 1 is an annular series of spaced teeth 2, forming between them radially extending pockets or recesses 3. It will be noted that these teeth or projections are tapering, being wide at the base and having inclined sides 2$^a$, so as to be comparatively narrow at the outer end. By reference to Fig. 3, it will be seen that in plan they are also sector shaped, so that the spaces or pockets between them are of substantially uniform width throughout their radial length.

Into the pockets or recesses 3 fit the cutters shown in Figs. 6 and 7. Each of these cutters consists of a tool holder 4, in which is suitably mounted a cutting tool 5. This tool is of substantially rectangular shape and is provided with a peripheral cutting edge 5$^a$, parallel with the axis of the spindle, and a second cutting edge 5$^b$, projecting from the face of the cutter head and disposed substantially perpendicular to the axis of the spindle. Each tool holder 4 is provided near its outer end with a raised portion or projection 6 on each side of the tool, such raised portion being of substantially the same dimensions as a similar raised portion 8 formed upon each of the teeth 2. The result of this is that when the tool holders are placed in the pockets 3, as shown at the left of Fig. 3, the raised portions 6 and 8 abut so as to form a practically continuous rim or flange around the periphery of the face of the cutter head, the outer ends of such raised portions being substantially flush with each other.

It will be noted that each of the tool holders tapers axially to conform to the shape of the recesses 3, such tool holders being wide at their outer face and comparatively narrow on their inner face. This is clearly shown in Fig. 2 and is indicated by dotted lines in Fig. 6.

The inner end of each of the radially disposed tool holders is provided on its outer face with a plurality of transverse grooves 9, the tool holders when assembled, as shown in Fig. 3, having such grooved ends abutting so that the grooves register in such a way as to form a continuous spiral thread. Coöperating with the grooves in the tool holders is the spiral thread 11, formed on the inner face of an adjusting disk 10. As clearly shown in Figs. 1 and 2, this disk 10 is provided with a pair of holes 12 for the reception of a spanner wrench or key by which it may be turned. The outer periphery of the disk 10 is provided with an annular flange 13 for the purpose now to be described.

In order to maintain the various parts in position, I employ the notched annular plate shown in Fig. 4 and designated in its entirety by the reference numeral 14. This plate fits down over the tool holders assembled as in Fig. 3, and is secured to the body of the cutter head by means of a plurality of axially extending tap bolts 17, such bolts passing through openings 7, formed in the body 1, and taking in screw-threaded openings 16 formed in said plate. By reference to Figs. 2 and 5, it will be seen that the plate 14 is provided with an annular shoulder 14ª, on its inner periphery which overlies the flange 13, formed on the disk 10. This firmly holds such disk in engagement with the tool holders, so that the threads are in mesh, and at the same time, permits said disk to turn freely so that the tools may be radially adjusted.

The plate 14 is provided around its periphery with a series of radially disposed notches 15, adapted to fit around the tools 5, as clearly shown in Figs. 1 and 2. It will be further observed that the teeth 2 and tool holders 4 are cut away in such a manner as to form a circular depression for the reception of the plate 14, and it will therefore be seen by reference to Fig. 2, that the outer surfaces of such plate, as well as the disk 10, are flush with the raised portions 6 and 8 of the tool holders and teeth. In other words, the entire outer face of the cutter head lies in a single plane, with the exception of the cutters 5, which, of course, project axially beyond such plane.

In order to determine accurately the amount of adjustment given to the cutters, I provide the face of the cutter head with a scale 18. This is preferably formed on the plate 14, around its inner periphery where it abuts the disk 10. A pointer 19 coöperates with the scale 18, and is carried by the disk 10. In order to enable radial adjustments of the cutters to be accurately determined by means of this scale, it is necessary to adjust the position of the pointer relative to the disk 10, so that such pointer may be set at zero where the cutters are in their fully retracted position. The wearing away of the cutters renders re-adjustment of the pointer necessary. In order to secure such adjustment, I preferably provide the face of the disk 10 with an undercut annular groove 20, in which the pointer 19 is secured by means of a clamping bolt or the like. The pointer can therefore be set in any position around the periphery of the disk.

The tool holders 4 do not extend entirely to the center, but terminate preferably at a point substantially flush with the spindle 1ª, thus leaving an open space 21 between the inner ends of the tool holders. Such space is preferably closed by means of a cap 23, screwed into a threaded opening 22, formed in the disk 10, such cap 23 being provided with holes 24 for the reception of a wrench or key.

In operation, the bolts 17 are first slightly loosened to relieve the pressure on the tool holders, and then the disk 10 may be turned by means of a suitable wrench, thus forcing the cutters radially outward to any desired extent, the amount of such movement being determined by the scale. The bolts are then tightened up, thus jamming the tapering tool holders into the similarly shaped pockets or recesses, thereby clamping them firmly in position.

It will thus be seen that I have provided a cutter head which is extremely easy to assemble and adjust and yet is strong, rigid, and of neat appearance, and it is thought that the many advantages of my invention will be appreciated without further discussion.

What I claim is:

1. In a milling cutter, a cutter head comprising a body and the usual spindle, an annular series of spaced teeth or projections extending axially from the face of the body and forming recesses between them, tool holders fitting in said recesses, cutting tools set in said holders and projecting beyond the same, a plate overlying said tool holders and having marginal notches to accommodate the tools, and means for clamping said tool holders axially between the body of the cutter head and said plate.

2. In a milling cutter, a cutter head comprising a body and the usual spindle, an annular series of spaced teeth or projections extending axially from the face of the body and forming recesses between them, tool holders fitting in said recesses, cutting tools set in said holders and projecting beyond the same, a plate overlying said tool holders and having marginal notches to accommodate the tools, the end of said tool holders and teeth lying substantially flush with each other and with the outer surface of said plate, and means for clamping said tool holders axially between the body of the cutter head and said plate.

3. In a milling cutter, a cutter head comprising a body and the usual spindle, an annular series of spaced teeth or projections extending axially from the face of the body and forming recesses between them, tool holders fitting in said recesses, cutting tools set in said holders and projecting beyond the same, a plate overlying said tool holders and having marginal notches to accommodate the tools, said teeth and tool holders having their ends lying flush, and being provided with cut away portions to receive said plate, whereby the outer surface of said plate is substantially flush with the ends of said teeth and tool holders, and means for securing said plate in position.

4. In a milling cutter, a cutter head comprising a body and the usual spindle, said body having an annular series of axially tapering recesses formed in the face thereof, similarly shaped tool holders fitting in said recesses, a plate overlying said tool holders, and means for forcing said plate axially so as to jam said tool holders into said recesses.

5. In a milling cutter, a cutter head comprising a circular body, and the usual spindle, said body having an annular series of axially tapering recesses formed in the face thereof and extending to the periphery, similarly shaped radially adjustable tool holders fitting in said recesses and terminating flush with the peripheral surface of said body, when in retracted position, tools in said holders projecting beyond such peripheral surface, and a plate overlying said holders and maintaining them in position, each of said tool holders having a shoulder adapted to abut against the edge of said plate to limit the inward movement of said tool holders.

6. In a milling cutter, a cutter head comprising a cylindrical body having an annular series of radially extending recesses formed in the face thereof, cutters slidably mounted in said recesses and having grooves formed in the outer face of their inner ends, a disk having on its inner face a spiral thread adapted to engage said cutters, an annular plate and means for securing said plate to said body, said plate having a portion overlying said disk and serving to maintain it in position.

7. In a milling cutter, a cutter head comprising a cylindrical body, a series of radially disposed adjustable cutters carried thereby, the inner ends of such cutters being provided with grooves, a disk having on its inner face a spiral thread adapted to engage said grooves, and an annular plate mounted on said body surrounding said disk and having on its inner edge a shoulder engaging said disk and holding it in position.

8. In a milling cutter, a cutter head comprising a cylindrical body, a series of radially disposed adjustable cutters carried thereby, the inner ends of such cutters being provided with grooves, a disk having on its inner face a spiral thread adapted to engage said grooves, said disk lying flush with the outer face of the cutter head, a scale being formed on such face, and a pointer carried by said disk, whereby the amount of adjustment of said cutters may be determined.

9. In a milling cutter, a cutter head comprising a cylindrical body, a series of radially disposed adjustable cutters carried thereby, the inner ends of such cutters being provided with grooves, a disk having on its inner face a spiral thread adapted to engage said grooves, said disk lying flush with the outer face of the cutter head, a scale being formed on such face, a pointer carried by said disk, and means for adjustably securing said pointer at different positions on said disk.

10. In a milling cutter, a cutter head comprising a cylindrical body, a series of radially disposed adjustable cutters carried thereby, the inner ends of such cutters being provided with grooves, a disk having on its inner face a spiral thread adapted to engage said grooves, an annular plate surrounding said disk and having on its inner edge a shoulder adapted to engage said disk, the disk having a central opening to afford access to the interior of the cutter head, and a screw cap closing said opening.

In testimony whereof I have affixed my signature, in presence of two witnesses.

AUGUST FRANZ THAU.

Witnesses:
JEAN GRUND,
CARL GRUND.